United States Patent Office 2,867,606
Patented Jan. 6, 1959

---

2,867,606

POLYMERIZABLE ORGANOPOLYSILOXANE SOLUTIONS AND THE PROCESS OF PREPARING GELS FROM THESE SOLUTIONS

Alfred R. Gilbert, Schenectady, N. Y., assignor to General Electric Company, a corporation of New York No Drawing. Application May 11, 1954
Serial No. 429,136

12 Claims. (Cl. 260—46.5)

This invention relates to polymerizable organopolysiloxane solutions comprising octamethylcyclotetrasiloxane containing from 0.05 to 20 percent, by weight, of a compound having the formula (I) 

where X is a member selected from the class consisting of halogen, acyloxy radicals, and dimethyl sulfonium iodide radicals, and catalytic amounts of a basic organopolysiloxane polymerization catalyst. This invention is also concerned with a process of preparing organopolysiloxane gels which comprises effecting reaction between (1) octamethylcyclotetrasiloxane, (2) from 0.05 to 20 percent, by weight, of the compound having the Formula I, and (3) catalytic amounts of a basic organopolysiloxane polymerization catalyst.

Heretofore, organopolysiloxane gels have been prepared by polymerizing diorganosiloxanes with suitable siloxane polymerization catalysts to form high molecular weight linear gums. These gums have then been reacted with peroxides such as benzoyl peroxide to crosslink the linear chains to form gels. This method of forming gels is disadvantageous in that the resulting gel contains the decomposition products of the peroxide. These decomposition products include, for example, acids and esters which tend to cause degradation of the final gel to a lower molecular weight state upon use of the gel at high temperatures. Thus, when the peroxide crosslinking agent used is benzoyl peroxide, the decomposition products include benzoic acid, p-phenylbenzoic acid, and phenylbenzoate. By the method of the present invention it is possible to form gels without the addition of these peroxide cross-linking agents. By my method, gels may be formed by merely adding a compound within the scope of Formula I to octamethylcyclotetrasiloxane which contains a basic organopolysiloxane polymerization catalyst. Upon heating the resulting solution, a cross-linked gel is formed which is free of peroxide decomposition products.

Compounds within the scope of Formula I include chloromethylheptamethylcyclotetrasiloxane, iodomethylheptamethylcyclotetrasiloxane, heptamethylcyclotetrasiloxanylmethyl formate, acetoxymethylheptamethylcyclotetrasiloxane, propionoxymethylheptamethylcyclotetrasiloxane, dimethyl-(heptamethylcyclotetrasiloxanylmethyl)-sulfonium iodide, etc. Chloromethylheptamethylcyclotetrasiloxane is a well known compound and may be prepared by passing chlorine gas through octamethylcyclotetrasiloxane and separating the former compound by fractional distillation of the product. Iodomethylheptamethylcyclotetrasiloxane may be prepared by refluxing a mixture of chloromethylheptamethylcyclotetrasiloxane and sodium iodide in acetone. The reaction products then may be added to water to precipitate the halogenated organopolysiloxanes. The iodomethylheptamethylcyclotetrasiloxane may be isolated from the precipitate by fractional distillation.

Compounds within the scope of Formula I where X is an acyloxy radical may be prepared by heating a solution of iodomethylheptamethylcyclotetrasiloxane and the silver salt of the desired carboxylic acid in the acid itself. Thus, acetoxymethylheptamethylcyclotetrasiloxane may be prepared by the method claimed in my joint copending application with Simon W. Kantor, Serial No. 429,133, filed concurrently herewith and assigned to the same assignee as the present invention. This compound is prepared by heating a mixture of iodomethylheptamethylcyclotetrasiloxane and silver acetate in glacial acetic acid. The organopolysiloxanes may be separated from the reaction mixture by pouring the reaction mixture into water and separating the oily layer formed. The acetoxymethylheptamethylcyclotetrasiloxane may be separated from this oily layer by fractional distillation.

Dimethyl - (heptamethylcyclotetrasiloxanylmethyl)-sulfonium iodide may be prepared from methyl-(heptamethylcyclotetrasiloxanylmethyl)-sulfide by mixing the latter compound with methyl iodide and allowing the mixture to stand for several hours. The product may be purified by washing with pentane. Methyl-(heptamethylcyclotetrasiloxanyl)-sulfide may be prepared by the method disclosed in the application of Glenn D. Cooper, Serial No. 349,099, filed April 15, 1953, Patent No. 2,719,165, and assigned to the same assignee as the present invention. This method comprises effecting reaction between chloromethylheptamethylcyclotetrasiloxane and sodium methyl mercaptide in absolute ethyl alcohol. The resulting sulfide may be separated by adding the reaction products to water, separating the organic layer, and fractionally distilling this layer.

Under the action of a basic organopolysiloxane polymerization catalyst, the compounds within the scope of Formula I are believed to provide the cross-links necessary for the formation of gels by hydrolysis of the —CH$_2$X radical, where X is as defined above, to form a compound made up of two cyclic portions joined by a silicon-oxygen-silicon linkage. This compound has the probable structure (II) 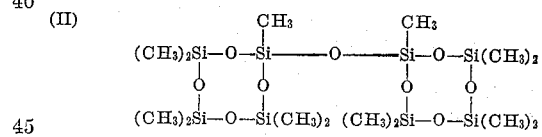

Concurrent with the formation of compound (II), the basic organopolysiloxane polymerization catalyst also is believed to rupture a silicon-oxygen linkage in each of the cyclic portions of compound (II) and also to rupture corresponding linkages in octamethylcyclotetrasiloxane with which the compound within the scope of Formula I is mixed. This results in a mixture of short-chain linear and short-chain cross-linked dimethyl siloxanes which are condensed to form a high molecular weight gel which is cross-linked by silicon-oxygen-silicon bonds.

As stated above, the concentration of compounds within the scope of Formula I may vary from about 0.05 percent to 20 percent, by weight, of the octamethylcyclotetrasiloxane present. The amount of compound (I) included controls the properties of the final gel. For example, where low concentrations of compound (I) are used, the final gel is soft and flexible. As the concentration increases, the gel becomes harder until at concentrations of about 20 percent, by weight, a very firm gel is obtained. Preferably, we use concentrations of compound (I) varying from about 0.05 percent to 10 percent, by weight.

Any of the basic organopolysiloxane polymerization catalysts may be used in the polymerizable solution and process of the present invention. The concentration of catalyst used may vary within wide limits as long as catalytic amounts are present. By "catalytic amounts of a basic organopolysiloxane polymerization catalyst" I mean an amount of catalyst sufficient to cause polymerization of the low molecular weight organopolysiloxane solution of the present invention to a high molecular weight organopolysiloxane. In general, from about 0.001 to 0.5 percent, by weight, of polymerization catalyst has been found to be effective. Among the basic catalysts which may be used in the present invention are included the metal hydroxide catalysts such as potassium hydroxide and cesium hydroxide. Also included are the transient organopolysiloxane polymerization catalysts such as the solid quaternary ammonium hydroxide catalysts disclosed in the copending application of Simon W. Kantor, Serial No. 429,132, now abandoned, filed concurrently herewith and assigned to the same assignee as the present invention. These solid quaternary ammonium hydroxide catalysts are solid tetramethyl ammonium hydroxide and solid benzyl trimethyl ammonium hydroxide. Other suitable transient catalysts are the quaternary phosphonium catalysts disclosed in my joint copending application with Simon W. Kantor, Serial No. 429,134, now abandoned, filed concurrently herewith and assigned to the same assignee as the present invention. These quaternary phosphonium catalysts include tetra-n-butyl phosphonium hydroxide, butyl tricyclohexyl phosphonium hydroxide, tetraethyl phosphonium hydroxide, tetra-n-butyl phosphonium butoxide, etc. These quaternary phosphonium catalysts may be used as their concentrated aqueous solutions or concentrated organopolysiloxane solutions. I prefer to use these transient quaternary ammonium and quaternary phosphonium catalysts in the process of the present invention since these catalysts are decomposable upon heating to temperatures above about 130° C. Thus, a gel may be formed using these catalysts by the method of the present invention, and after the formation of the gel the catalyst may be decomposed. Gels formed from these transient catalysts retain their good physical and electrical properties for extended periods of time at temperatures as high as 250° C., while gels formed from the metal hydroxide catalysts revert to a lower molecular weight state upon being heated to these high temperatures.

The polymerizable organopolysiloxane solutions of the present invention may be prepared in a variety of ways. For example, a compound within the scope of Formula I may be added to octamethylcyclotetrasiloxane and a catalyst may then be added to the resulting solution. If desired, the catalyst may be added to the octamethylcyclotetrasiloxane first with the later addition of the compound (I). Where it is desirable to use a solution of chloromethylheptamethylcyclotetrasiloxane in octamethylcyclotetrasiloxane, the solution may be prepared by passing a sufficient amount of chlorine gas through the latter compound to form the desired concentration of the chlorinated compound and the hydrogen chloride formed during the reaction may be removed by any suitable means such as, for example, by washing the solution with water, by passing a stream of inert gas through the solution, or by subjecting the solution to a vacuum. After the hydrogen chloride has been removed from the solution, the basic organopolysiloxane polymerization catalyst may be added to the solution in the desired amount to form the polymerizable organopolysiloxane solution of the present invention.

Where the gels prepared by the method of the present invention are to be used as potting gels in electrical apparatus it is desirable to obtain a gel containing no air bubbles. Since octamethylcyclotetrasiloxane sometimes contains some dissolved air which could lead to the formation of bubbles in the final gel, it is desirable to subject this compound to a vacuum to remove this air. This air may be evacuated before compound (I) or the catalysts are added or after either or both of these ingredients are added. After the removal of dissolved air it is preferable to place the evacuated product under a nitrogen atmosphere to prevent the solution of additional oxygen. It should be understood that satisfactory gels may be formed by the method of the present invention without the removal of dissolved air from the octamethylcyclotetrasiloxane and without the maintenance of a nitrogen atmosphere above the evacuated product.

In general, the solution of octamethylcyclotetrasiloxane, compound (I), and the polymerization catalyst is formed at room temperature. However, any other convenient temperature may be used. After the solution has been formed, with or without the removal of dissolved air, the solution is heated up to the temperature at which polymerization takes place. The temperature and time of polymerization depend on the particular polymerization catalyst used. For example, when using potassium hydroxide as the polymerization catalyst, the temperature of the reaction usually varies from about 145–160° C. When using cesium hydroxide, the temperature polymerization ranges from about 110–150° C. When using quaternary ammonium hydroxides, the temperature range is from about 75–130° C. When using a quaternary phosphonium catalyst, the temperature of polymerization may vary from about room temperature up to about 130° C. The time required for polymerization to be completed is shortest at the upper limits of the temperature ranges for the various catalysts. Thus, when using potassium hydroxide at a temperature near 160° C., polymerization is completed in two to three hours. When using either the quaternary ammonium or quaternary phosphonium catalysts at temperatures from about 110–130° C., the polymerization is completed in several minutes. When using a quaternary ammonium or quaternary phosphonium catalyst, it is essential to maintain the polymerization temperature below about 130° C., the temperature at which these catalysts decompose. After the formation of a gel using these catalysts, it is desirable to heat the gel to a temperature above about 130° C. for times up to about one hour to cause decomposition of the polymerization catalyst.

The following examples are illustrative of the practice of my invention and are not intended for purposes of limitation.

*Example 1*

A tetra-n-butyl phosphonium hydroxide catalyst was prepared by mixing 6 cc. of an aqueous solution of tetra-n-butyl phosphonium hydroxide, containing 51 mg. of the hydroxide per cc. of solution, with 95 grams of octamethylcyclotetrasiloxane. The mixture was evacuated at about 2 microns for two and one-half hours. This resulted in a homogeneous clear solution containing 43.5 mg. of tetra-n-butyl phosphonium hydroxide per cc. A catalyzed solution of octamethylcyclotetrasiloxane was then prepared by mixing 1.3 ml. of this catalyst solution with 191 grams of the former compound. A polymerizable solution was then formed by adding 0.2 gram of chloromethylheptamethylcyclotetrasiloxane to 47.8 grams of the catalyzed octamethylcyclotetrasiloxane solution. Twenty ml. of this latter solution was placed in a test tube and evacuated for five minutes at 1 mm. to remove any dissolved air. Dry nitrogen was added to return the system to one atmosphere and the sample was heated for ten minutes at 110° C. At the end of this time a stiff cross-linked gel had been formed which was free of bubbles and which was insoluble in toluene. This gel was heated twenty minutes in a 250° C. air oven to destroy the catalyst. The remainder of the polymerizable octamethylcyclotetrasiloxane containing chloromethylheptamethylcyclotetrasiloxane was allowed to stand at room temperature for about sixty-five hours. At the end of this time a stiff cross-linked gel had been formed.

*Example 2*

A second solution of chloromethylheptamethylcyclotetrasiloxane in catalyzed octamethylcyclotetrasiloxane was prepared by adding 0.05 gram of the former compound to 47.8 grams of the catalyzed octamethylcyclotetrasiloxane solution prepared in Example 1. By the method of Example 1 this solution was evacuated for five minutes at 1 mm. to remove any dissolved air and dry nitrogen was added to return the system to one atmosphere. The sample was then heated for ten minutes at 110° C. to form a firm cross-linked, toluene insoluble gel.

*Example 3*

A solution of 50 grams of octamethylcyclotetrasiloxane and 0.5 gram of chloromethylheptamethylcyclotetrasiloxane were placed in a beaker and heated to 110° C. At this time approximately 0.1 gram of solid tetramethyl ammonium hydroxide containing about 25 percent, by weight, water of crystallization was added and the solution was maintained between 110 and 120° C. for five minutes. At the end of this time a stiff cross-linked, toluene insoluble gel had formed.

*Example 4*

A polymerizable solution was prepared by mixing 0.1 gram of acetoxymethylheptamethylcyclotetrasiloxane with 47.8 grams of the catalyzed octamethylcyclotetrasiloxane solution of Example 1. The acetoxymethylheptamethylcyclotetrasiloxane had been prepared by the method described in my joint copending application referred to above, Serial No. 429,133, which is hereby incorporated by reference into the present Example. This solution was evacuated for five minutes at 1 mm. and returned to one atmosphere by allowing nitrogen to enter the system. The solution was then heated for ten minutes at 110° C. to form a firm cross-linked gel which was insoluble in toluene.

*Example 5*

Methyl-(heptamethylcyclotetrasiloxanylmethyl-(sulfide was prepared by adding 330 grams (1.0 mole) of chloromethylheptamethylcyclotetrasiloxane to a solution of 1.0 mole of sodium methyl mercaptide in 500 ml. of absolute alcohol. The solution was cooled in an ice bath and stirred for four hours. Two liters of water were then added and the organic layer which was formed was separated, washed with water, and dried over calcuim chloride. The pure sulfide was obtained by fractional distillation. Dimethyl - (heptamethylcyclotetrasiloxanyl) - sulfonium iodide was formed from methyl-(heptamethylcyclotetrasiloxanylmethyl)-sulfide by mixing 7.0 grams of the latter compound with 5.7 grams of methyl iodide and allowing the mixture to stand overnight in the dark. This resulted in a crystalline mass which was filtered and washed several times with pentane to yield pure dimethyl-(heptamethylcyclotetrasiloxanylmethyl)-sulfonium iodide. A polymerizable solution was then formed by adding 0.1 gram of dimethyl-(heptamethylcyclotetrasiloxanylmethyl)-sulfonium iodide to 47.8 grams of the catalyzed octamethylcyclotetrasiloxane solution prepared in Example 1. This solution was then evacuated for five minutes at 1 mm. to remove dissolved air and brought back to atmospheric pressure by the introduction of nitrogen. The solution was then heated at 110° C. for ten minutes to form a stiff, cross-linked gel which was insoluble in toluene.

Although the present invention has been described with reference to a solution of compounds within the scope of Formula I in octamethylcyclotetrasiloxane containing a basic organopolysiloxane polymerization catalyst, it should be understood that other cyclic dimethyl siloxanes or dialkyl silanes or diaryl silanes such as, for example, the trimer, or pentamer, or octamer of dimethylsiloxane, cyclic diethylsiloxanes, cyclic diphenyl siloxanes, cyclic methylethyl siloxanes, cyclic methylphenyl siloxanes, etc., may be substituted for the octamethylcyclotetrasiloxane.

The gels formed from the polymerizable organopolysiloxane solutions by the method of the present invention are useful as potting gels in electrical apparatus. For example, the gels of the present invention may be formed inside of transformers and the like to function as insulating and dielectric materials.

What I claim as new and desired to secure by Letters Patent of the United States is:

1. An organopolysiloxane solution polymerizable to a cross-linked gel consisting of octamethylcyclotetrasiloxane containing from 0.05 to 20 percent, by weight, based on the weight of said octamethylcyclotetrasiloxane, of a compound having the formula

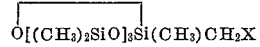

where X is a member selected from the class consisting of halogen, acyloxy radicals, and dimethyl sulfonium iodide radicals, and a catalytic amount of a basic organopolysiloxane polymerization catalyst.

2. An organopolysiloxane solution polymerizable to a cross-linked gel consisting of octamethylcyclotetrasiloxane containing from 0.5 to 20 percent, by weight, based on the weight of said octamethylcyclotetrasiloxane, of chloromethylheptamethylcyclotetrasiloxane and a catalytic amount of a basic organopolysiloxane polymerization catalyst.

3. An organopolysiloxane solution polymerizable to a cross-linked gel consisting of octamethylcyclotetrasiloxane containing from 0.05 to 20 percent, by weight, based on the weight of said octamethylcyclotetrasiloxane, of acetoxymethylheptamethylcyclotetrasiloxane and a catalytic amount of a basic organopolysiloxane polymerization catalyst.

4. An organopolysiloxane solution polymerizable to a cross-linked gel consisting of octamethylcyclotetrasiloxane containing from 0.05 to 20 percent, by weight, based on the weight of said octamethylcyclotetrasiloxane, of dimethyl - (heptamethylcyclotetrasiloxanylmethyl)-sulfonium iodide and a catalytic amount of a basic organopolysiloxane polymerization catalyst.

5. An organopolysiloxane solution polymerizable to a cross-linked gel consisting of octamethylcycloeterasiloxane containing from 0.05 to 20 percent, by weight, based on the weight of said octamethylcyclotetrasiloxane, of a compound having the formula

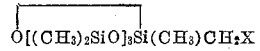

where X is a member selected from the class consisting of halogen, acyloxy radicals, and dimethyl sulfonium iodide radicals, and from 0.001 to 0.5 percent, by weight, of tetra-n-butyl phosphonium hydroxide.

6. An organopolysiloxane solution polymerizable to a cross-linked gel consisting of octamethylcyclotetrasiloxane containing from 0.05 to 20 percent, by weight, based on the weight of said octamethylcyclotetrasiloxane, of a compound having the formula

where X is a member selected from the class consisting of halogen, acyloxy radicals, and dimethyl sulfonium iodide radicals, and from 0.001 to 0.5 percent, by weight, of solid tetramethyl ammonium hydroxide.

7. The process of preparing a cross-linked organopolysiloxane gel which comprises mixing and heating (1) octamethylcyclotetrasiloxane, (2) from 0.05 to 20 percent, by weight, based on the weight of said octamethylcyclotetrasiloxane, of a compound having the formula

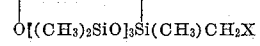

where X is a member selected from the class consisting of halogen, acyloxy radicals, and dimethyl sulfonium iodide radicals, and (3) a catalytic amount of a basic organopolysiloxane polymerization catalyst.

8. The process of preparing a cross-linked organopolysiloxane gel which comprises mixing and heating (1) octamethylcyclotetrasiloxane, (2) from 0.05 to 20 percent, by weight, based on the weight of said octamethylcyclotetrasiloxane, of chloromethylheptamethylcyclotetrasiloxane, and (3) a catalytic amount of a basic organopolysiloxane polymerization catalyst.

9. The process of preparing a cross-linked organopolysiloxane gel which comprises mixing and heating (1) octamethylcyclotetrasiloxane, (2) from 0.05 to 20 percent, by weight, based on the weight of said octamethylcyclotetrasiloxane, of acetoxymethylheptamethylcyclotetrasiloxane, and (3) a catalytic amount of a basic organopolysiloxane polymerization catalyst.

10. The process of preparing a cross-linked organopolysiloxane gel which comprises mixing and heating (1) octamethylcyclotetrasiloxane, (2) from 0.05 to 20 percent, by weight, based on the weight of said octamethylcyclotetrasiloxane, of dimethyl-(heptamethylcyclotetrasiloxanylmethyl)-sulfonium iodide, and (3) a catalytic amount of a basic organopolysiloxane polymerization catalyst.

11. The process of preparing a cross-linked organopolysiloxane gel which comprises mixing and heating (1) octamethylcyclotetrasiloxane, (2) from 0.05 to 20 percent, by weight, based on the weight of said octamethylcyclotetrasiloxane, of a compound having the formula

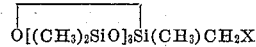

$$\overline{O[(CH_3)_2SiO]_3Si(CH_3)CH_2X}$$

where X is a member selected from the class consisting of halogen, acyloxy radicals, and dimethyl sulfonium iodide radicals, and (3) from 0.001 to 0.5 percent, by weight, of tetra-n-butyl phosphonium hydroxide.

12. The process of preparing a cross-linked organopolysiloxane gel which comprises mixing and heating (1) octamethylcyclotetrasiloxane, (2) from 0.05 to 20 percent, by weight, based on the weight of said octamethylcyclotetraslioxane, of a compound having the formula

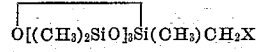

$$\overline{O[(CH_3)_2SiO]_3Si(CH_3)CH_2X}$$

where X is a member selected from the class consisting of halogen, acyloxy radicals, and dimethyl sulfonium iodide radicals, and (3) from 0.001 to 0.5 percent, by weight, of solid tetramethyl ammonium hydroxide.

References Cited in the file of this patent

UNITED STATES PATENTS

| | | |
|---|---|---|
| 2,234,548 | Brannon | Mar. 11, 1941 |
| 2,443,353 | Hyde | June 15, 1948 |
| 2,457,539 | Elliott et al. | Dec. 18, 1948 |
| 2,490,357 | Hyde | Dec. 6, 1949 |
| 2,723,987 | Speier | Nov. 15, 1955 |

FOREIGN PATENTS

| | | |
|---|---|---|
| 608,956 | Great Britain | Sept. 23, 1948 |